United States Patent [19]

Hager et al.

[11] Patent Number: 5,652,279

[45] Date of Patent: Jul. 29, 1997

[54] POLYETHER POLYOLS SUITABLE FOR FLEXIBLE POLYURETHANE FOAM PREPARED BY CO-INITIATION OF AQUEOUS SOLUTIONS OF SOLID POLYHYDROXYL INITIATORS

[75] Inventors: Stanley L. Hager, Crosslanes, W. Va.; James E. Knight; Gregory F. Helma, both of Exton, Pa.; Ben J. Argento, South Charleston, W. Va.

[73] Assignee: ARCO Chemical Technology, L.P., Greenville, Del.

[21] Appl. No.: 734,557

[22] Filed: Oct. 21, 1996

Related U.S. Application Data

[62] Division of Ser. No. 507,102, Jul. 26, 1995, Pat. No. 5,596,059.

[51] Int. Cl.$^6$ .................................................. C08G 18/48
[52] U.S. Cl. ............................................. 521/175; 521/914
[58] Field of Search ................................. 521/175, 914

[56] References Cited

U.S. PATENT DOCUMENTS

| | | | |
|---|---|---|---|
| 4,166,172 | 8/1979 | Klein | 536/4 |
| 4,316,991 | 2/1982 | Speranza | 568/609 |
| 4,820,810 | 4/1989 | Klein et al. | 536/4.1 |
| 4,950,694 | 8/1990 | Hager | 521/167 |
| 5,045,623 | 9/1991 | Horn et al. | 528/60 |
| 5,272,183 | 12/1993 | Doerge | 521/131 |
| 5,306,798 | 4/1994 | Horn et al. | 528/58 |

*Primary Examiner*—Rachel Gorr
*Attorney, Agent, or Firm*—Dennis M. Kozak

[57] ABSTRACT

Polyoxyalkylene polyether polyols suitable for preparation of flexible polyurethane foams are prepared by oxyalkylating an aqueous solution of one or more polyhydric, hydroxyl-functional solid initiators under conditions where both water as well as initiator are oxyalkylated. The polyols have calculated functionalities of between about 2.2 and 4.0 and hydroxyl numbers in the range of 10 to 180. The polyols may be used to prepare soft, high resiliency polyurethane flexible foams at low isocyanate indexes.

4 Claims, No Drawings

POLYETHER POLYOLS SUITABLE FOR FLEXIBLE POLYURETHANE FOAM PREPARED BY CO-INITIATION OF AQUEOUS SOLUTIONS OF SOLID POLYHYDROXYL INITIATORS

This is a division of application Ser. No. 08/507,102 filed Jul. 26, 1995 now allowed as U.S. Pat. No. 5,596,059.

TECHNICAL FIELD

The present invention pertains to co-initiated polyoxyalkylene polyether polyols suitable for the preparation of flexible polyurethane foam, and to the polyurethane foam prepared therefrom. More particularly, the subject invention pertains to co-initiated polyoxyalkylene polyether polyols prepared by oxyalkylating an aqueous solution of a polyhydric, hydroxy-functional solid initiator molecule. The subject polyether polyols are particularly useful in the preparation of all water-blown polyurethane slabstock foam.

BACKGROUND ART

Polyurethane foam is prepared by the reaction of a di- or polyisocyanate with an isocyanate reactive component in the presence of a physical or chemical blowing agent. In general, one or more surfactants are required to stabilize the foam so as to produce a uniform cell structure and prevent foam collapse. The reaction is generally catalyzed, commonly by the use of tin-based and/or amine-based catalysts. A general discussion of polyurethane foams, the ingredients useful in the preparation thereof, and suitable blowing agents, surfactants, catalysts, additives, and auxiliaries may be found in the POLYURETHANE HANDBOOK, Gunter Oertel, Ed., Hanser Publishers, Munich, Germany, © 1985, and in POLYURETHANES: CHEMISTRY AND TECHNOLOGY, J. H. Sanders and K. C. Frisch, Interscience Publishers, New York, 1963.

Polyurethane flexible foams have acquired a separate status in the art. In rigid polyurethane foams, the isocyanate component is reacted with isocyanate-reactive polyols having high functionality and high hydroxyl number (low equivalent weight) to produce a stiff and rigid, and generally closed cell product. Such products are useful as insulation foams and, in the higher density ranges, as structural components. Blowing of the foams may be accomplished by water as a reactive blowing agent, reacting with excess isocyanate to create carbon dioxide and provide urea linkages in addition to urethane linkages, but is more often accomplished by use of volatile physical blowing agents such as R-22, HCFC-123, HCFC-141b, pentane, or other blowing agents, sometimes in conjunction with minor amounts of water. The use of chlorofluorocarbons (CFCs) has been largely discontinued due to environmental concerns.

Flexible polyurethane foams, by contrast, are soft and resilient and predominately open-celled products that are prepared from low functionality, low hydroxyl number polyols, and are generally all water-blown or blown with water and a non-CFC physical blowing agent. Flexible foams require the use of polyether polyols and polyol blends of relatively low functionality and low hydroxyl number. A discussion of the physical properties of conventional and high resiliency flexible polyurethane foams may be found in U.S. Pat. No. 4,950,694, which is herein incorporated by reference. The useful range of polyol functionality necessary to produce an acceptable flexible foam lies between about 1.8 and 3.5, with hydroxyl numbers ranging between 10 and 180, and more often in the middle range, i.e., between 20 and 80.

For these reasons, nominally trifunctional polyether polyols in the above hydroxyl ranges have been the mainstay of polyurethane flexible foam manufacture. Such polyether polyols are prepared by the oxyalkylation of trifunctional initiators such as glycerine or tri-methylolpropane, particularly the former, with propylene oxide and ethylene oxide in the presence of a basic oxyalkylation catalyst. Residual minor quantities of water contained in the initiator or introduced with the catalyst are typically removed through a stripping operation prior to beginning the oxyalkylation to insure an adequate and reproducible functionality for the final polyol product. During oxyalkylation with propylene oxide, the accompanying rearrangement of the latter to allyl alcohol and its subsequent oxyalkylation introduces polyoxyalkylene monols which lower the overall functionality. See, e.g., BLOCK AND GRAFT POLYMERIZATION, Vol. 2, Ceresa, Ed., John Wiley & Sons, pp. 17–21. Average, measured functionalities in the range of 2.2 to about 2.8 are most common. To raise or lower the functionality, it is necessary to prepare coinitiator blends with higher or lower functionality initiators or to blend polyols prepared from individual initiators of different functionality. Another alternative for raising the functionality is to add an epoxy resin during the oxyalkylation process as described in U.S. Pat. No. 4,316,991.

Glycerine, however, the most commonly used initiator in polyoxyalkylene polyether polyol production, has become a relatively high cost starting material and similarly functional lower cost replacements are not available. Additionally, stripping of residual water levels and blending of initiators or polyols or adding epoxy resins to control the functionality of the polyol leads to more complicated and costly processes.

High functionality polyether polyols (rigid polyols) suitable for rigid polyurethane foams have been prepared by oxyalkylating a number of polyhydric initiators containing four or more reactive hydrogens, such as ethylene diamine, the various toluene diamines and methylenedianilines, pentaerythritol, and saccharides and disaccharides, such as sucrose, α-methylglucoside, sorbitol, and various starch-based products. Functionalities of from 4 to 8 and higher are useful in such applications.

Oxyalkylation of polyhydric, hydroxyl-functional initiators such as the saccharides, disaccharides, and their chemically modified derivatives to produce rigid polyols is rendered difficult by the fact that such initiators are predominantly solids with elevated melting points. In many cases, the melting point is above the temperatures desired for oxyalkylation with propylene oxide, the predominate alkylene oxide used to prepare polyether polyols suitable for polyurethane applications. In many cases, even when the melting point is low, only discolored products are obtained. Thus, such initiators have generally been dissolved in an unreactive organic solvent, the heel of a previously prepared polyether polyol batch, or a reactive liquid initiator such as ethylene glycol, propylene glycol, or glycerine. However, use of previously prepared polyols as solvents results in polyols containing high molecular weight, low hydroxyl number coproducts, while use of propylene glycol or other liquid hydroxyl-functional initiators produces a polyol blend containing lower functionality species. In the latter cases, the amount of glycol or triol must be severely limited, otherwise the average functionality and hydroxyl number will be lowered below the range useful for polyurethane rigid foams. U.S. Pat. No. 5,045,623 discloses a polyol having an average functionality of 4.77 and a hydroxyl number of 490 initiated with a mixture of sorbitol (functionality 6) and propylene glycol in a weight ratio of 92:8, for example.

Sorbitol itself has been used as an initiator, or as a co-initiator/cosolvent with other saccharides or disaccharides such as sucrose, to prepare high functionality, high hydroxyl number rigid polyols, as described in U.S. Pat. No. 5,306,798. The relatively low melting point of sorbitol (93°–95° C.) facilitates this use. However, for such use, sorbitol must be obtained in a water-free state, thus elevating product cost. Preparation of high functionality, high hydroxyl number polyols from concentrated aqueous solutions (syrups) of sucrose containing from 10 to 20 weight percent water in the presence of urea is disclosed in U.S. Pat. No. 4,820,810. A two-stage oxyalkylation is performed, wherein unreacted water is stripped following the first oxyalkylation to leave a water content of from 8–10 weight percent or less. Following the second oxyalkylation, further unreacted water is removed. Rigid polyols having hydroxyl numbers in the range of 550 to 750 are obtained. The products are noted to contain various reaction products of alkylene oxide and urea.

In U.S. Pat. No. 4,166,172, a process for oxyalkylating aqueous solutions of polyhydric initiators, particularly sucrose, is disclosed, wherein ammonia gas is utilized as the oxyalkylation catalyst, the ammonia being oxyalkylated in the process to form alkoxyalkanotamines which also act catalytically in a later polyurethane-forming reaction. The disclosed process produced polyether polyols having hydroxyl numbers in the 500–600 range. As is the case with the process disclosed in U.S. Pat. No. 4,820,810, the water present is stated to react poorly, and thus the product has minimal diol content, ensuring high functionality.

U.S. Pat. No. 5,272,183 discloses preparation of rigid polyurethane foams from rigid polyols prepared from initiators having average functionalities of from 4 to 8, separately, or in conjunction with other initiators such as glycerine or water. The polyols, stated as suitable for low K-factor foams blown with HCFC-123 or HCFC-141b, have hydroxyl numbers between 200 and 650.

The high functionality, high hydroxyl number rigid polyols prepared as disclosed in the above-identified references are not suitable for the preparation of flexible polyurethane foams. Moreover, the introduction of substances such as urea and ammonia into the oxyalkylation process results in complex mixtures which frequently contain catalytically active species which may interfere with the production of slabstock and other commodity flexible foams.

It would be desirable to provide polyoxyalkylene polyols having hydroxyl numbers and functionalities suitable for use as the dominate polyol in flexible polyurethane foam production without employing relatively expensive initiators such as glycerine.

It would further be desirable in the production of such polyols to reduce or eliminate the stripping of minor residual quantities of water contained in initiators or introduced into initiators through addition of oxyalkylation catalysts.

It would be desirable to produce polyols of widely varying functionality from a single initiator starting material rather than preparing multicomponent initiator mixes or by blending polyols prepared from initiators of varying functionality.

It would further be desirable to offer to the polyurethane flexible foam industry, polyoxyalkylene polyether polyols of functionality and hydroxyl number which can serve as economical replacements for conventional trifunctional polyether polyols.

It would be further desirable to provide polyoxyalkylene polyether polyol compositions which are capable of providing polyurethane flexible foams over wider processing and formulating ranges and with enhanced physical properties.

SUMMARY OF THE INVENTION

It has now been unexpectedly discovered that polyoxyalkylene polyether polyols prepared by oxyalkylating aqueous solutions of one or more solid, polyhydric, hydroxyl-functional initiators until the hydroxyl number is about 180 or below are ideally suited to the production of good quality flexible polyurethane foam. Using conventional base catalysis, the relatively large amount of water present is oxyalkylated to produce a co-initiated blend of low functionality diols and higher functionality polyols whose average functionality is within the range useful for flexible foam production, and which may serve as a substantially direct replacement for glycerine initiated polyols. The ability of water-coinitiated polyols to replace glycerine-initiated polyols is surprising and unexpected in view of the great difference in the make-up of the respective polyols, the latter being nominally tri-functional, while the polyols of the subject invention are mixtures of di-functional and tri-, preferably tetra- to octa- or higher functional polyols. Particularly surprising and unexpected is that the subject polyols offer broad formulating and processing latitude in the production of flexible polyurethane foam and may allow the production of softer foam grades without resorting to the use of physical blowing agents.

DESCRIPTION OF THE PREFERRED EMBODIMENTS

The subject polyoxyalkylene polyether polyols have average calculated functionalities of from about 2.2 to about 4.0, hydroxyl numbers of between about 10 and about 180, and are prepared by oxyalkylating an aqueous solution comprising water and one or more polyhydric, hydroxyl-functional, solid initiators having nominal functionalities greater than or equal to 3, and preferably 4 or higher, in the presence of one or more suitable oxyalkylation catalysts which provide for both oxyalkylation of water as well as the solid initiator(s). The polyol products typically contain 50 mol percent or more of polyoxyalkylene diols.

Suitable polyhydric hydroxyl-functional, solid initiators are those solid initiators having nominal functionalities of three or more, preferably four or more, which are soluble in water to the extent required to prepare a polyoxyalkylene polyether polyol of suitable average functionality, i.e., a calculated functionality from about 2.2 to about 4.0, preferably from about 2.3 to about 3.7, and most preferably from about 2.4 to about 3.5. By the term "solid" is meant solid in the pure state at 25° C. or normally expected ambient temperatures. The extent of water solubility, however, refers not to ambient temperature solubility, but to solubility under the expected oxyalkylation reaction temperatures, i.e., from about 70° C. to 150° C., preferably 90° C.–120° C. The term "average functionality" refers to the calculated functionalities based on initiator charge. Actual, measured functionalities are generally lower due to monol content, for example in the range of 1.8 to about 3.3.

For example, the calculated functionality of the polyol expected from a 70/30 weight ratio blend of sorbitol/water is:

$$F = \frac{(\text{mol sorbitol}) \times 6 + (\text{mol water}) \times 2}{(\text{mol sorbitol} + \text{mol water})}$$

$$F = \frac{70 \times 6/182 + 30 \times 2/18}{(70/182 + 30/18)} = 2.75$$

Suitable polyhydric, hydroxyl-functional, solid initiators are, for example, trimethylolpropane, pentaerythritol, dipentaerythritol, tripentaerythritol, polyglycerol, saccharides such as glucose, sorbitol, lactose, mannose, galactose, and fructose; polysaccharides such as sucrose; various low molecular weight hydrolyzed starches; saccharide and polysaccharide derivatives such as α-methylglucoside and α-hydroxyethylglucoside, and the like. Sorbitol and sucrose are preferred, with the former being particularly preferred.

The polyhydric, hydroxyl-functional, solid initiators are preferably derived from biological sources and supplied, when possible, as concentrated syrups. If supplied as the pure solid or mixture of solids, the solid initiator is dissolved in a suitable amount of water prior to oxyalkylation. The presence of water is critical, as water will also be oxyalkylated under the reaction conditions employed.

Suitable amounts of water are such that the average calculated functionality of the polyoxyalkylene polyether polyol product will be within the ranges specified previously. The amount of water present during oxyalkylation is thus inversely dependent on the desired average functionality as well as the hydroxyl equivalent weight of the solid initiator or mixture of solid initiators. The hydroxyl number of the polyol product is from about 10 to about 180, preferably 10 to about 150, more preferably from 20 to 120, and most preferably from 20 to about 80.

For example, employing sorbitol as a single solid initiator, an aqueous syrup containing c.a. 70% sorbitol and 30% water by weight, when oxyalkylated to a hydroxyl number of 56, will produce a product with an average calculated functionality of about 2.75. Other hexoses, having hydroxyl equivalent weights in the range of c.a. 30 Da should behave similarly. Sucrose has a higher functionality than sorbitol, eight as opposed to six. However, the molecular weight of sucrose is considerably greater than sorbitol, and thus the hydroxyl equivalent weight is c.a. 43 Da. For the same average functionality, therefore, sucrose syrups must be slightly more concentrated than sorbitol syrups. Pentaerythritol has a hydroxyl equivalent weight between that of sorbitol and sucrose. In general, water contents between about 90 weight percent and 12 weight percent are suitable, more preferably between 50 weight percent and 12 weight percent, and most preferably between 40 weight percent and 15 weight percent. With respect to sorbitol, the preferred solid initiator, water contents between 50 weight percent and 12 weight percent, more preferably between 40 weight percent and 12 weight percent are highly suitable.

If supplied as a syrup, the water content may be adjusted by adding additional water or by removing water by distillation or stripping prior to oxyalkylation, particularly under reduced pressure. This provides an easy and convenient means of producing polyols of different functionality without the need for blending initiators or polyols of different functionality. Additional solid initiators may be added, and if desired, liquid co-initiators may be added as well, for example ethylene glycol, propylene glycol, or glycerine.

Oxyalkylation of the aqueous solutions containing solid initiators may be conducted with conventional alkylene oxides such as ethylene oxide, propylene oxide, 1,2- and 2,3-butylene oxide, and the like. Preferably, propylene oxide and ethylene oxide, or mixtures thereof, are used. When more than one alkylene oxide are used for oxyalkylation, the alkylene oxides may be reacted sequentially to form block polyoxyalkylene polyether polyols, particularly polyoxypropylene polyether polyols terminated with one or more oxyethylene moieties as a cap; mixtures of alkylene oxides to form a random oxyalkylene copolymer; or varieties of these modes of addition to result in random, block, block-random, or other polyoxyalkylene chains as are well known to those skilled in the art. For high resilience (HR) foam, a polyoxyethylene capped polyol with relatively high primary hydroxyl content is desirable, whereas for conventional flexible foams, secondary hydroxyl termination is preferred.

Oxyalkylation preferably takes place under conventional conditions using basic catalysts, for example alkali metal hydroxides or alkoxides, barium hydroxide, strontium hydroxide, and the like. These catalysts can be added as solids which are easily solubilized in the aqueous initiator solution or can be added as an aqueous solution. The oxyalkylation may be advantageously interrupted to provide an initial product of high hydroxyl number, followed by further oxyalkylation. This method is particularly useful when reactor volume is limited or where the initial charge may not be able to be agitated adequately due to its small volume in a large reactor. The hydroxyl number of such first stage, intermediate products is generally above 180, preferably above 200, more preferably greater than 300, and most preferably in the range of 400 to 700. Oxyalkylation of these intermediate products may be continued using the same contained catalyst, additional basic oxyalkylation catalyst may be added, or the catalyst may be removed, and further oxyalkylation performed with an alternative catalyst, for example a double metal cyanide complex.

For higher molecular weight products of low hydroxyl number, it may be particularly advantageous to halt conventional base-catalyzed oxyalkylation, whether one or two stage, at an intermediate molecular weight and continue further oxyalkylation with catalysts such as calcium naphthenate with or without addition of tertiary amine cocatalysts, or with double metal cyanide complex catalysts. Suitable double metal cyanide complex catalysts are disclosed in copending U.S. patent application Ser. No. 08/156, 534 and U.S. Pat. No. 5,158,922.

The polyoxyalkylene polyether polyols of the subject invention may be used to prepare polyurethane flexible foams in the conventional manner, advantageously at isocyanate indices of from 130 to 70, preferably 125 to 85, and most preferably 120 to 90. The isocyanate may be any organic di- or polyisocyanate, for example toluene diisocyanate (TDI) methylenediphenylene-diisocyanate (MDI), polymeric MDI of higher functionality, i.e. greater than 2 to about 3.4, or modified isocyanates derived from reacting the above-isocyanates with themselves or with monomeric or oligomeric glycols or polyols to form urethane, urea, carbodiimide, allophanate, uretonimine, or other modified isocyanates. TDI and MDI or their mixtures are preferred, in conjunction with either or both of tin and amine catalysts.

Having generally described this invention, a further understanding can be obtained by reference to certain specific examples which are provided herein for purposes of illustration only and are not intended to be limiting unless otherwise specified.

EXAMPLE 1

A polyoxyalkylene polyether polyol is prepared in a two-stage process using a 70/30 weight percent syrup of sorbitol/water as the initiator, having a calculated average functionality of 2.75. Potassium hydroxide oxyalkylation catalyst in flake form is added at 120° C. in such amount that the first stage product contains 0.25 weight percent KOH. A vacuum of c.a. 1–3 psia is applied to the system prior to heating up. Propylene oxide is added and the initiator mixture oxyalkylated at c.a. 117° C. to form a c.a. 255 hydroxyl number intermediate, first stage product.

To a portion of the first stage product is added additional KOH prior to a second oxyalkylation to raise the KOH concentration to 0.34 weight percent based on the final product weight. Oxyalkylation is conducted with a 86/14 mixture of propylene oxide and ethylene oxide at 105° C. to form a final product having a hydroxyl number of c.a. 56 and an estimated functionality of 2.5. Basic catalyst residues are removed by conventional treatment. To the polyether polyol product is added a conventional antioxidant stabilizer package. The product has an APHA color of 25 and a viscosity of c.a. 440 cks at 25° C. This polyol is designated as "Polyol A".

EXAMPLE 2

The procedure of Example 1 is followed, but prior to oxyalkylation the sorbitol concentration in the initiator mixture is raised to yield an 88/12 weight ratio of sorbitol/water. The polyol product has a calculated functionality of 3.7 and an estimated functionality of about 3.2, and a hydroxyl number of 56. This polyol is designated as "Polyol B".

EXAMPLES 3 TO 8 AND COMPARATIVE EXAMPLES 3C TO 8C

A series of nominal 1.8 pcf polyurethane flexible foams are prepared in bench foaming tests employing constant levels of tin and amine catalysts. The tin catalyst is T-9 (dibutyltindilaurate) at 0.2 parts per 100 parts polyol, and the amine catalyst A-133 (bis(2-dimethylaminoethyl)ether, active component) at 0.15 parts per 100 parts polyol. Polyol A is the polyol of Example 1 and contained 0.01 parts water. Polyol C is a prior art, glycerine initiated polyol having a hydroxyl number of 56, a measured functionality of 2.7, and a random internal ethylene oxide content of c.a. 8.5 weight percent. Polyol C contains 0.08 weight percent water. Each foam formulation contains 3.8 parts water per 100 parts polyol (not including water contained in the polyol), and employs 0.600 parts of a foam stabilizing silicone surfactant L-620 available from OSi Chemicals. The foams were prepared by reacting the polyol component described above, with toluene diisocyanate (TDI) at isocyanate indices of from 110 to 85. The results are presented in Table 1. The actual isocyanate index for each foam, taking into account all water, is in parentheses.

TABLE 1

| EXAMPLE | 3C | 3 | 4C | 4 | 5C | 5 |
|---|---|---|---|---|---|---|
| POLYOL C | 100.000 | | 100.000 | | 100.000 | |
| POLYOL A | | 100.000 | | 100.000 | | 100.000 |
| TDI | 49.970 | 49.970 | 45.430 | 45.430 | 43.150 | 43.150 |
| INDEX | 110.000 | 110.000 | 100.000 | 100.000 | 95.000 | 95.000 |
|  | (108.2) | (109.8) | (98.3) | (99.8) | (93.4) | (94.8) |
| PHYSICAL PROPERTIES: | | | | | | |
| DENSITY | 1.540 | 1.590 | 1.660 | 1.720 | 1.720 | 1.740 |
| RESILIENCY | 28.000 | 28.000 | 30.000 | 30.000 | 33.000 | 32.000 |
| POROSITY | 3.040 | 3.510 | 3.240 | 3.210 | 4.700 | 5.440 |
| IFD_THICK | 4.060 | 4.060 | 4.070 | 4.090 | 4.080 | 4.080 |
| IFD_25% | 47.550 | 45.670 | 44.470 | 44.550 | 38.700 | 36.080 |
| IFD_65% | 93.300 | 91.130 | 88.280 | 89.100 | 76.950 | 71.780 |
| IFD_25%_RT | 33.750 | 32.850 | 33.080 | 33.220 | 29.630 | 27.750 |
| RETURN_VAL | 70.980 | 71.920 | 74.370 | 74.580 | 76.550 | 76.920 |
| IFD_65/25 | 1.960 | 2.000 | 1.980 | 2.000 | 1.990 | 1.990 |
| TENSILE | 13.070 | 12.220 | 13.150 | 10.840 | 13.740 | 12.460 |
| ELONGATION | 144.090 | 139.740 | 161.270 | 122.250 | 230.840 | 200.540 |
| TEAR | 1.140 | 1.070 | 1.330 | 1.140 | 1.800 | 2.560 |
| COMP_90% | 3.240 | 2.570 | 2.940 | 2.810 | 2.100 | 2.030 |
| HA_COMP_75 | 4.590 | 4.40 | 3.230 | 4.000 | 2.190 | 3.120 |
| WET_SET_50 | 2.480 | 2.740 | 2.200 | 2.350 | .930 | 1.190 |

| EXAMPLE | 6C | 6 | 7C | 7 | 8C | 8 |
|---|---|---|---|---|---|---|
| POLYOL C | 100.000 | | 100.000 | | 100.000 | |
| POLYOL A | | 100.000 | | 100.000 | | 100.000 |
| TDI | 40.880 | 40.880 | 38.610 | 38.610 | 36.340 | 36.340 |
| INDEX | 90.000 | 90.000 | 85.000 | 85.000 | 80.000 | 80.000 |
|  | (88.5) | (89.8) | (83.6) | (84.8) | (78.7) | (79.8) |
| PHYSICAL PROPERTIES: | | | | | | |
| DENSITY | Split | 1.740 | Split | 1.760 | Split | Split |
| RESILIENCY | | 32.000 | | 33.000 | | |
| POROSITY | | 4.990 | | 5.290 | | |
| IFD_THICK | | 4.050 | | 4.070 | | |
| IFD_25% | | 33.080 | | 32.330 | | |
| IFD_65% | | 67.800 | | 65.700 | | |
| IFD_25%_RT | | 25.270 | | 24.830 | | |
| RETURN_VAL | | 76.420 | | 76.800 | | |
| IFD_65/25 | | 2.050 | | 2.030 | | |
| TENSILE | | 13.030 | | 13.400 | | |
| ELONGATION | | 213.660 | | 239.660 | | |
| TEAR | | 1.890 | | 1.790 | | |
| COMP_90% | | 1.690 | | 2.570 | | |
| HA_COMP_75 | | 3.450 | | 3.440 | | |
| WET_SET_50 | | 3.970 | | 3.210 | | |

Table 1 indicates that physical properties of water-blown polyurethane foams prepared from the sorbitol/water initiated polyols of the subject invention (Polyol A) surprisingly are quite similar to those derived from a similar, glycerine initiated polyol (Polyol C) despite the fact that the latter contains nearly all trifunctional species (plus propylene oxide-derived monol), while the subject polyol, in addition to monol, is a mixture of species having nominal functionalities of two and six. In the bench scale tests presented in Table 1, the ability to formulate at lower index without splitting is particularly surprising, and may offer the ability to utilize less of the more expensive isocyanate component and/or may signify wider formulating and processing latitude. The foams prepared from the sorbitol/water initiator blends were also somewhat softer (note 25% ILD) and of slightly higher density than the foams prepared from glycerine-initiated polyols. The difference in softness may be due to the lower average (measured) functionality (2.4 versus 2.7) of the sorbitol/water polyol.

EXAMPLES 9 TO 13 AND COMPARATIVE EXAMPLES 9C AND 13C

Water-blown polyurethane flexible foams were prepared with TDI at an isocyanate index of 105 with constant levels of amine catalyst and tin catalyst ranging from 0.14 to 0.18 parts per 100 parts polyol. Polyol A (Example 1) and Polyol B (Example 2) were used alone and in blends, and compared to similar glycerine-initiated polyols, Polyol C (previously described) and Polyol D, a glycerine-initiated, epoxy resin modified polyol having an actual functionality of about 3.2 and a hydroxyl number of 56, containing random oxypropylene and oxyethylene moieties in a ratio of 85/15. The formulations and physical properties are presented in Table 2. The dramatic similarity between the sorbitol/water-initiated polyols and glycerine-initiated polyols of similar functionality is apparent.

TABLE 2

| EXAMPLE | 9C | 9 | 10 | 11 | 12 | 13 | 13C |
|---|---|---|---|---|---|---|---|
| POLYOL B (88/12) | | 100 | 75 | 50 | 25 | | |
| POLYOL A (70/30) | | | 25 | 50 | 75 | 100 | |
| POLYOL C | | | | | | | 100 |
| POLYOL D | 100 | | | | | | |
| WATER | 3.8 | 3.8 | 3.8 | 3.8 | 3.8 | 3.8 | 3.8 |
| A-133 | 0.2 | 0.2 | 0.2 | 0.2 | 0.2 | 0.2 | 0.2 |
| T-9 | 0.14 | 0.14 | 0.14 | 0.18 | 0.18 | 0.18 | 0.18 |
| L-620 | 0.6 | 0.6 | 0.6 | 0.6 | 0.6 | 0.6 | 0.6 |
| TDI | 47.7 | 47.7 | 47.7 | 47.7 | 47.7 | 47.7 | 47.7 |
| INDEX | 105 | 105 | 105 | 105 | 105 | 105 | 105 |
| PHYSICAL PROPERTIES: | | | | | | | |
| DENSITY | 1.69 | 1.78 | 1.74 | 1.67 | 1.7 | 1.59 | 1.63 |
| RESILIENCY | 30 | 32 | 30 | 32 | 34 | 37 | 33 |
| AIR FLOW | 4.27 | 3.55 | 3.5 | 4.24 | 4.52 | 5.96 | 5.33 |
| IFD_THICK | 4.06 | 4.05 | 4.04 | 4.01 | 4.01 | 3.99 | 4.02 |
| IFD_25% | 48.07 | 49.79 | 48.96 | 43.13 | 40.88 | 32.55 | 32.17 |
| IFD_65% | 91.03 | 96.07 | 91.72 | 83.03 | 79.95 | 65.93 | 64.72 |
| RETURN_VAL | 71.78 | 73.11 | 71.25 | 70.43 | 73.03 | 72.58 | 74.59 |
| IFD_65/25 | 1.89 | 1.93 | 1.87 | 1.93 | 1.96 | 2.03 | 2.01 |
| TENSILE | 11.48 | 9.4 | 10.62 | 10.96 | 7.52 | 12.3 | 12.23 |
| ELONGATION | 135.6 | 97.14 | 114.04 | 131.25 | 96.98 | 209.42 | 222.4 |
| TEAR | 0.99 | 0.67 | 0.76 | 1.07 | 1.17 | 1.52 | 2.3 |
| COMP_90% | 3.36 | 2.74 | 3.19 | 2.94 | 3.2 | 4.21 | 4.42 |
| WET_SET_50 | 3.19 | 3.03 | 3.19 | 2.43 | 2.51 | 3.83 | 3.59 |

EXAMPLES 14 TO 19 AND COMPARATIVE EXAMPLES 14C TO 19C

A series of water-blown polyurethane foams of 1.7 lb/ft$^3$ nominal density were prepared from the polyol of Example 1 (Polyol A) and a similar glycerine-initiated polyol (Polyol C) at various levels of tin catalyst to assess processing latitude, at an isocyanate index of 105. The foams prepared from the sorbitol/water-initiated polyols displayed excellent processing latitude and in general, good overall performance properties. The formulations and physical properties are presented in Tables 3 and 4.

TABLE 3

| EXAMPLE | 14 | 14C | 15 | 15C | 16 | 16C |
|---|---|---|---|---|---|---|
| POLYOL A | 100 | | 100 | | 100 | |
| POLYOL C | | 100 | | 100 | | 100 |
| WATER | 3.8 | 3.8 | 3.8 | 3.8 | 3.8 | 3.8 |
| WATER, COR. | — | 3.87 | — | 3.87 | — | 3.87 |
| A-133 | 0.15 | 0.15 | 0.15 | 0.15 | 0.15 | 0.15 |
| T-9 | 0.2 | 0.2 | 0.15 | 0.15 | 0.25 | 0.25 |
| L-620 | 0.6 | 0.6 | 0.6 | 0.6 | 0.6 | 0.6 |
| TDI | 47.7 | 47.7 | 47.7 | 47.7 | 47.7 | 47.7 |
| INDEX | 105 | 105 | 105 | 105 | 105 | 105 |
| PHYSICAL PROPERTIES: | | | | | | |
| BLOW OFF | 116 | 115 | 130 | 135 | 109 | 104 |
| SETTLE % | 0.81 | 0.89 | 1.98 | 1.19 | 1.48 | 0.79 |
| DENSITY | 1.65 | 1.57 | 1.61 | 1.54 | 1.57 | 1.47 |

TABLE 3-continued

| EXAMPLE | 14 | 14C | 15 | 15C | 16 | 16C |
|---|---|---|---|---|---|---|
| DENSITY, COR. | — | 1.6 | — | 1.57 | — | 1.5 |
| RESILIENCY | 46 | 33 | 31 | 33 | 35 | 34 |
| AIR FLOW | 4.23 | 3.14 | 6.11 | 6 | 3.34 | 2.07 |
| IFD_THICK | 4.07 | 4.08 | 4.15 | 4.1 | 4.09 | 4.11 |
| IFD_25% | 44.66 | 50.43 | 39.67 | 43.31 | 44.76 | 49.54 |
| IFD_65% | 86.73 | 93.03 | 77.39 | 82 | 83.25 | 89.7 |
| RETURN_VAL | 72.26 | 68.45 | 71.52 | 68.64 | 69.29 | 67.52 |
| IFD_65/25 | 1.94 | 1.84 | 1.95 | 1.89 | 1.86 | 1.81 |
| TENSILE | 11.57 | 12.1 | 11.31 | 12.04 | 13.14 | 14.32 |
| ELONGATION | 117.68 | 113.55 | 135.09 | 130.68 | 148.13 | 147.83 |
| TEAR | 1.12 | 1.16 | 1.23 | 1.11 | 1.35 | 1.33 |
| COMP_90% | 2.57 | 2.56 | 2.58 | 1.98 | 3.21 | 3.4 |
| HA_COMP_75 | 3.77 | 3.61 | 3.51 | 3.52 | 3.75 | 3.83 |
| WET_SET_50 | 2.38 | 2.46 | 2.36 | 2.21 | 2.42 | 2.73 |

TABLE 4

| EXAMPLE | 17 | 17C | 18 | 18C | 19 | 19C |
|---|---|---|---|---|---|---|
| POLYOL A | 100 | | 100 | | 100 | |
| POLYOL C | | 100 | | 100 | | 100 |
| WATER | 3.8 | 3.8 | 3.8 | 3.8 | 3.8 | 3.8 |
| WATER, COR. | — | 3.87 | — | 3.8 | — | 3.8 |
| A-133 | 0.15 | 0.15 | 0.2 | 0.2 | 0.2 | 0.2 |
| T-9 | 0.2 | 0.2 | 0.14 | 0.14 | 0.18 | 0.18 |
| L-620 | 0.6 | 0.6 | 0.6 | 0.6 | 0.6 | 0.6 |
| TDI | 47.7 | 47.7 | 47.7 | 47.7 | 47.7 | 47.7 |

TABLE 4-continued

| EXAMPLE | 17 | 17C | 18 | 18C | 19 | 19C |
|---|---|---|---|---|---|---|
| INDEX | 105 | 105 | 105 | 105 | 105 | 105 |
| PHYSICAL PROPERTIES: | | | | | | |
| BLOW OFF | | | 134 | 122 | 114 | 110 |
| SETTLE % | 0.56 | 0.17 | 0.64 | 0.4 | 0.13 | 0.46 |
| DENSITY | 1.67 | 1.59 | 1.74 | 1.68 | 1.74 | 1.63 |
| DENSITY, COR. | — | 1.62 | — | 1.68 | — | 1.63 |
| RESILIENCY | 38 | 39 | 32 | 33 | 37 | 33 |
| AIR FLOW | 2.7 | 3.07 | 6.14 | 5.95 | 5.96 | 5.33 |
| IFD_THICK | 4.07 | 4.06 | 4.05 | 4.05 | 3.99 | 4.02 |
| IFD_25% | 44.03 | 43.42 | 36.57 | 31.25 | 32.55 | 32.17 |
| IFD_65% | 89.18 | 85.05 | 71.93 | 64.27 | 65.93 | 64.72 |
| RETURN_VAL | 72.91 | 74.27 | 72.08 | 72.06 | 72.58 | 74.59 |
| IFD_65/25 | 2.03 | 1.96 | 1.97 | 2.06 | 2.03 | 2.01 |
| TENSILE | 10.56 | 13.61 | 10.21 | 13.15 | 12.3 | 12.23 |
| ELONGATION | 108.86 | 165.03 | 157.08 | 226.89 | 209.42 | 222.4 |
| TEAR | 1.09 | 1.22 | 1.13 | 1.75 | 1.52 | 2.3 |
| COMP_90% | 3.99 | 2.84 | 3.38 | 3.31 | 4.21 | 4.42 |
| HA_COMP_75 | 4.48 | 3.77 | — | — | — | — |
| WET_SET_50 | 2.34 | 2.51 | 2.73 | 3.05 | 3.83 | 3.59 |

Having now fully described the invention, it will be apparent to one of ordinary skill in the art that many changes and modifications can be made thereto without departing from the spirit or scope of the invention as set forth herein.

What is claimed is:

1. A polyurethane flexible foam comprising the reaction product of:

a) an organic di- or polyisocyanate, at an isocyanate index of from about 70 to about 130; with b) a polyether polyol component comprising at least one polyoxyalkylene polyether polyol comprising the oxyalkylation product of an aqueous solution of one or more polyhydric, hydroxyl-functional solid initiators comprising a saccharide, polysaccharide, or derivative thereof, wherein the water content of said aqueous solution is between 12 weight percent and 90 weight percent relative to the weight of said aqueous solution, and wherein said polyoxyalkylene polyether polyol has a calculated functionality of between about 2.2 and 4.0 and a hydroxyl number between about 10 and about 180 in the presence of c) an effective amount of a urethane reaction-promoting catalyst;

d) water as a reactive blowing agent in an amount effective to prepare a flexible foam having a density of between about 0.5 lb/ft$^3$, and 6 lb/ft$^3$; and optionally e) a cell-stabilizing amount of one or more surfactants.

2. The polyurethane flexible foam of claim 1 further comprising a non-reactive blowing agent such that the density of said polyurethane flexible foam is between about 0.5 lb/ft$^3$ and 3.5 lb/ft$^3$.

3. The polyurethane flexible foam of claim 1 wherein said isocyanate index is between about 85 and 125.

4. The polyurethane flexible foam of claim 1 wherein said at least one polyoxyalkylene polyether polyol comprises a polyol having a calculated functionality between about 2.2 and 3.7 and a hydroxyl number between about 20 and about 60, prepared by oxyalkylating an aqueous solution comprising sorbitol and from about 12 weight percent to about 50 weight percent water.

* * * * *